United States Patent [19]

Khan

[11] 3,920,623
[45] Nov. 18, 1975

[54] TREATMENT OF CHLOROPRENE-SULFUR COPOLYMERS WITH BENZOTHIAZOLE SULFENAMIDES

[75] Inventor: Ausat Ali Khan, Newark, Del.

[73] Assignee: E. I. Du Pont de Nemours & Company, Wilmington, Del.

[22] Filed: May 25, 1973

[21] Appl. No.: 363,806

Related U.S. Application Data

[63] Continuation-in-part of Ser. No. 227,660, Feb. 18, 1972, abandoned.

[52] U.S. Cl.... 260/92.3; 260/79.5 C; 260/85.5 XA; 260/86.3; 260/94.7 S
[51] Int. Cl.². ... C08D 5/02; C08D 3/14; C08D 1/38
[58] Field of Search........... 260/29.7 SQ, 82.7, 92.3, 260/94.2, 94.4, 94.7 S, 786, 85.5 XA, 86.3, 87.1

[56] References Cited
UNITED STATES PATENTS

| | | | |
|---|---|---|---|
| 2,476,688 | 7/1949 | Tewksburg | 260/306.6 |
| 3,378,538 | 4/1968 | Sparks | 260/92.3 |

*Primary Examiner*—Christopher A. Henderson, Jr.

[57] ABSTRACT

Polymerizing chloroprene in an alkaline-aqueous emulsion in the presence of elemental sulfur to form a chloroprene polymer latex and incorporating into the system at a time no later than when the polymer is in the latex state, e.g., during polymerization, at least about 0.5 part by weight per hundred parts organic monomer of a sulfenamide compound having the structure

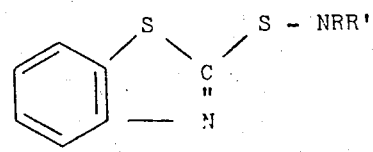

where R and R' are alkyl, cycloalkyl, aralkyl radicals or one of R or R' can be hydrogen, or R and R' together can form a saturated ring with the nitrogen, e.g., 2-(morpholinothio)benzothiazole and after polymerization and subsequent to the addition of the sulfenamide, or at the same time the sulfenamide is added, separately adding certain peptizing agents.

16 Claims, No Drawings

TREATMENT OF CHLOROPRENE-SULFUR COPOLYMERS WITH BENZOTHIAZOLE SULFENAMIDES

CROSS-REFERENCE TO RELATED APPLICATION

This application is a continuation-in-part of application Ser. No. 227,660, filed Feb. 18, 1972, now abandoned.

BACKGROUND OF THE INVENTION

This invention relates to a process for making chloroprene-sulfur copolymers yielding vulcanizates having improved flex-resistance, and tear strength after aging.

Chloroprene-sulfur copolymers, sometimes referred to as sulfur-modified chloroprene polymers, have been commercially available for many years and have enjoyed wide acceptance as versatile elastomers having good resistance to oils, solvents, and greases. Such chloroprene polymers are prepared by polymerizing chloroprene in an aqueous emulsion in the presence of a free radical catalyst and elemental sulfur. Despite the already superior properties of the resulting polymers, still further improvements are constantly being sought. Two significant properties that have an effect upon the use to which chloroprene polymers can be put are flex resistance and tear strength after aging. Improvements in these properties result in a chloroprene polymer that can be fabricated into articles used in applications in which the article is subjected to stress and high temperatures, such as in V-belts and mining cables, requiring good flex resistance and tear strength.

SUMMARY OF THE INVENTION

It has now been found that chloroprene-sulfur copolymers yielding vulcanizates having improved flex resistance and tear strength after aging can be prepared if there is present in the polymerization system particular sulfenamides and if after polymerization certain peptizing agents are added to the polymer. More particularly, the present invention is directed to a process for making chloroprene-sulfur copolymers which comprises polymerizing chloroprene in an alkaline aqueous emulsion in the presence of elemental sulfur and free radical polymerization catalyst to form a chloroprene polymer latex, and incorporating into the system at a time no later than when the polymer is in the latex state at least about 0.5 part by weight per hundred parts organic monomer of a sulfenamide compound having the structure

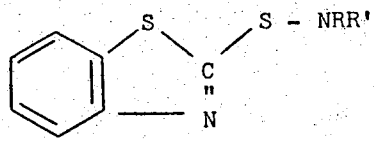

where R and R' are independently alkyl, cycloalkyl, aralkyl radicals or one of R or R' is hydrogen, or R and R' together form with the nitrogen a morpholine or saturated ring containing only carbon and hydrogen in addition to the nitrogen, and after polymerization and subsequent to the addition of the sulfenamide, or at the same time thereof, separately adding to the polymer at least about 0.1 part by weight per hundred parts organic monomer of at least one peptizing agent selected from the group dialkyl xanthogen disulfides, water-soluble salts of alkyl xanthic acids, and water-soluble salts of dialkyl dithiocarbamic acids. It is necessary to add the sulfenamide to the system no later than when the polymer is in the latex state, i.e., before isolation of the polymer from the latex. Generally, the sulfenamide is added to monomer before polymerization is initiated, or it is added after polymerization has been terminated but while the polymer is still in the latex state. The sulfenamide can also be added to the system during polymerization of the chloroprene. In order to realize the beneficial effects in relation to flex resistance and tear strength at least about 0.5 part by weight per hundred parts monomer of the sulfenamide is added. Further, the process also includes the addition to the polymer, while the polymer is either in the latex state or after isolation, of at least one peptizing agent selected from the group dialkyl xanthogen disulfides, water-soluble salt of alkyl xanthic acids, or, preferably, water-soluble salt of dialkyldithiocarbamic acids.

DETAILED DESCRIPTION OF THE INVENTION

The polymerization of chloroprene-sulfur copolymers is carried out in a conventional manner, except for the addition at the desired time of certain sulfenamides. Polymerization is conducted in an aqueous emulsion using a free radical polymerization catalyst, e.g., water-soluble alkali metal or ammonium ferricyanides and peroxy compounds such as alkali metal or ammonium persulfates, hydrogen peroxide, cumene hydroperoxide, and dibenzoyl peroxide, and elemental sulfur at temperatures between 0°C and 80°C, generally between 40°C and 50°C. As is well known in the art, polymerization can be carried to a predetermined desired degree and stopped by use of conventional "short-stopping" agents. Generally, monomer conversion is about from 50 to 98%.

Benzothiazolesulfenamides having the structure illustrated in the formula above can be used in the process of this invention. The particular substituents represented by R and R' in the formula can vary widely, but generally represent alkyl, cycloalkyl, or aralkyl radicals and one of R or R' can be hydrogen, or R and R' taken together can form a saturated ring with the nitrogen.

The number of carbon atoms in the alkyl, cycloalkyl, or aralkyl radicals is not critical and the upper limit is a matter of practical considerations. These radicals are preferably hydrocarbon radicals, although they may contain substituents which do not detrimentally affect polymerization. Generally, alkyl radicals will contain one to about 12 carbon atoms. The cycloalkyl radicals will usually contain 5-7 carbon atoms, although polycyclic rings can be used containing up to 12 carbon atoms. The aralkyl radicals that are used are those in which an aryl radical, preferably phenyl, is attached to the alkyl or a cycloalkyl radical. The cycloalkyl radicals can be substituents on the alkyl radicals or the cycloalkyl radicals can be substituted with alkyl radicals or other cycloalkyl radicals. Representative examples of suitable NRR' radicals of the above type include diethylamino, dimethylamino, diisopropylamino, tert-butylamino, octylamino, (1-ethylcyclohexyl)amino, cyclohexylcyclopentylamino, (1,1-3,3-tetramethylbutyl)amino, dodecylamino, benzylamino, (α-methylbenzyl)amino, and diphenethylamino.

When the —NRR' of the above formula forms a saturated ring, it may be morpholine or a saturated ring containing only carbon and hydrogen in addition to the nitrogen. In general, each ring will contain 5 to 7 members, including the nitrogen although polycyclic rings may contain, for example, up to 12 members. The rings may be substituted with hydrocarbon radicals, particularly with alkyl, cycloalkyl, or aryl hydrocarbon radicals containing up to 6 carbon atoms. Representative examples of radicals of the type in which —NRR' is part of a cyclic structure are morpholino (i.e., 4-morpholinyl), 2,6-dimethylmorpholino, 3,5-dimethylmorpholino, piperidino (i.e., 1-piperidyl), pyrrolidinyl, hexahydro-1-azepinyl, 3-azabicyclo[3.2.0]hept-3-yl, and 3-azabicyclo[3.2.2]non-3-yl. The preferred sulfenamide used in the process of this invention is 2-(morpholinothio)benzothiazole because of its ready availability and over-all effectiveness.

The amount of benzothiazolesulfenamide present in the polymerization system is at least about 0.5, preferably about 1.5 to about 4 parts per hundred parts of monomer. At least about 0.5 part is needed to have the desired effect on the flex resistance and tear strength properties of the polymer; in general, no more than 10 parts per hundred parts monomer is required.

The sulfenamide can be an ingredient in the original chloroprene emulsion. Alternatively, it can be added to the polymerization system during or at the termination of polymerization. Polymerization can be terminated by adding a conventional so-called "short-stopping" agent, such as those described, for example, in U.S. Pat. No. 2,576,009. If a "short-stopping" agent is added to terminate polymerization, the sulfenamide can be incorporated as an ingredient in the emulsion containing the short-stopping agent composition, or it can be added separately either before or after polymerization has been stopped. When the sulfenamide is added to the latex, standard techniques for adding compounding ingredients to latex are followed, as described, for example, in "Neoprene Latex," by Carl, Elastomers Chemicals Department, E. I. du Pont de Nemours and Company, 1962, pages 125–132. A convenient method is to add the sulfenamide as an aqueous emulsion of a solution of the sulfenamide in toluene as illustrated hereinbelow in Example 1.

If polymerization is to be stopped at less than about 98% monomer conversion, arresting of polymerization is effected by the addition of a short-stopping agent to the latex that does not react with the sulfide linkages of the chloroprene-sulfur copolymer. Free radical scavengers, that is, compounds that destroy the free radicals present in the polymerization system, are especially effective. Representative free radical scavengers include phenothiazine, dihydric phenols, aralkyl derivatives thereof, and phenolic antioxidants substituted in at least one position ortho to the hydroxy group with a branched alkyl group containing 3–12 carbon atoms. Representative examples are hydroquinone, 2,5-di-tert-butylhydroquinone, 2,5-di-tert-amylhydroquinone, 4-tert-butylpyrocatechol, 4,4'-thiobis(6-tert-butyl-o-cresol), 4,4'-methylenebis(2,6-di-tert-butylphenol), 2,6-di-tert-butyl-α-(methylamino)-p-cresol,4,4'-thiobis(6-tert-butyl-m-cresol), and 2,6-di-tert-butyl-4-phenylphenol.

The amount of sulfur used in the polymerization process is ordinarily between about 0.25–2.5% based on the weight of organic monomer. The particular amount of sulfur employed will depend on the amount of sulfur desired in the polymer chain. The number of sulfide linkages incorporated in the polymer, will, in general, be proportional to the amount of sulfur present in the polymerization system and the number of intralinear sulfide linkages will determine the degree to which the molecular weight can be decreased by cleavage of the sulfide linkages with a peptizing agent. The preferred amount of sulfur present in preparing the polymers of this invention is about from 0.3–0.6 part per hundred parts of monomer.

After polymerization has been stopped and after or concomitant with the addition of the sulfenamide, a peptizing agent is added to the chloroprene polymer. The peptizing agent is preferably added to the polymer while it is still in latex form to lower the molecular weight of the polymer and make it easier to handle during isolation and processing. Although not preferred because of the high viscosity of the unpeptized polymer, the peptizing agent can be added to the isolated polymer during the compounding step (see Example 5). The peptizing agent must not be added to the polymer in the absence of the sulfenamide compound or to the sulfenamide compound in the absence of the polymer. Thus, the peptizing agent can be added to the latex after the sulfenamide has been added or it can be introduced at the same time as the sulfenamide provided that the two materials are added separately, that is, the materials are introduced in separate streams without having been previously contacted with each other.

Peptizing agents such as water-soluble salts of dialkyldithiocarbamic acids are represented by the structure

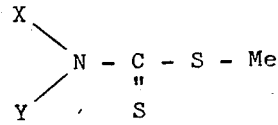

wherein X and Y are alkyl or cycloalkyl groups containing 1–8 carbon atoms or together X and Y can form a saturated ring containing 5–7 members in the ring, including the nitrogen, and Me is a sodium, potassium, or ammonium cation or the cation of an amine corresponding to the structure

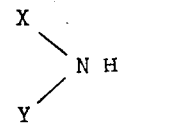

Representative examples of water-soluble salts of dialkyldithiocarbamic acids include sodium dimethyldithiocarbamate, sodium diethyldithiocarbamate, sodium 1-piperidinecarbodithioate, potassium dibutyldithiocarbamate, sodium cyclohexylethyldithiocarbamate, dibutylammonium dibutylidithiocarbamate, diethylammonium diethyldithiocarbamate, and piperidinium 1-piperidinecarbodithioate. Preferably, the peptizing agents are sodium salts of dialkyldithiocarbamates containing 1–4 carbon atoms in each alkyl radical.

The dialkyl xanthogen disulfide peptizing agents can be represented by the structure:

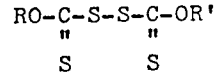

wherein R and R' are alkyl radicals having 1–8 carbon atoms. Examples of suitable alkyl radicals are methyl, ethyl, propyl, isopropyl, and the various isomeric butyl, amyl, hexyl, heptyl, and octyl radicals. The preferred dialkyl xanthogen disulfides are those in which each alkyl radical has 1–4 carbon atoms, especially diethyl xanthogen disulfide.

Water-soluble salts of alkyl xanthic acids useful as peptizing agents can be represented by the structure:

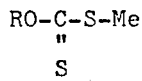

wherein R is an alkyl radical of 1–8 carbon atoms, and Me is a sodium or potassium cation.

The peptizing agents are used in the process in amounts ranging from about 0.1–5 parts by weight per hundred parts of organic monomer and preferably in amounts about from 0.25–3 parts. In the preferred process in which the peptizing agent is added to the latex, said latex is allowed to stand until the desired degree of peptization is obtained. Peptization is carried out at temperatures between 10° and 50°C. and usually is complete in one hour to 24 hours as evidenced by measurement of Mooney viscosity.

The presence in the system of tetraalkyl thiuram di- and polysulfides, conventionally employed in combination with dialkyldithiocarbamate salts in the peptization of chloroprene-sulfur copolymers, should be avoided because it will detract from the properties of the vulcanizates.

The concentration of organic monomer present in the starting emulsion can vary within a wide range. In general, 30 to 55% by weight, based on the total weight of the emulsion, is the range of concentrations of organic monomer used in the preparation of the polymer. It is to be understood that up to 50% of the chloroprene can be replaced by another copolymerizable monomer. Representative comonomers that can be used in the process include vinyl aromatic compounds, such as styrene, the vinyl toluenes, and vinylnaphthalenes; aliphatic conjugated diolefin compounds such as 1,3-butadiene, isoprene, 2,3-dimethyl-1,3-butadiene, and 2,3-dichloro-1,3-butadiene; vinyl ethers, esters, and ketones, such as methyl vinyl ether, vinyl acetate, and methyl vinyl ketone; esters, amides, and nitriles of acrylic and methacrylic acids, such as ethyl acrylate, methyl methacrylate, methacrylamide, and acrylonitrile.

Conventional emulsifying agents employed in chloroprene polymerization processes are used in the present process for preparing the monomer emulsion and include the water-soluble salts, particularly the sodium, potassium, or ammonium salts of compounds of the following types: long-chain fatty acids, rosins, or rosin derivatives, such as wood rosin, tall oil rosin, disproportionated rosins, or partially polymerized rosin, higher alcohol sulfates, and arylsulfonic acids such as alkylbenzenesulfonic acids, and the condensation product of formaldehyde with a naphthalenesulfonic acid.

If polymerization is stopped at less than about 98% conversion, unreacted monomer can be removed by conventional procedures such as, for example, turbannular steam stripping as disclosed in U.S. Pat. No. 2,467,769.

The polymers prepared by the process of this invention are isolated by standard techniques. For example, the pH can be adjusted to 5.5–6 and the polymer can then be coagulated by freezing in thin layers, as described in U.S. Pat. No. 2,187,146.

The chloroprene polymers prepared according to this invention, when vulcanized, i.e., cured and compounded, by conventional techniques, for example, methods described in "The Neoprenes," 1963, by Murray and Thompson, E. I. du Pont de Nemours and Company, or in Du Pont Chemicals for Elastomers Bulletin No. 63, NA–101, show a significant increase in flex resistance and tear strength after aging as compared with polymers prepared without the addition of the sulfenamides and peptizing agents.

For a clearer understanding of the invention, the following specific examples are given as being illustrative.

EXAMPLE 1

A chloroprene polymer is prepared by polymerizing an aqueous emulsion of chloroprene monomer using the following recipe:

|  | Parts by Weight |
|---|---|
| Chloroprene | 100 |
| Nancy wood rosin | 4 |
| Sulfur | 0.3 |
| Water | 126 |
| Sodium hydroxide | 0.7 |
| Sodium salt of condensate of formaldehyde and a naphthalenesulfonic acid ("Lomar" PW, Nopco Chemical Co.) | 0.7 |
| Copper ion (added as copper sulfate) | 0.00004 |

Polymerization is carried out at 40°C to a monomer conversion of about 72% by the addition of a catalyst which is a 5% aqueous solution of potassium persulfate containing about 0.125% sodium 2-anthraquinonesulfonate.

Polymerization is stopped by adding 7.25 parts of an emulsion which provides about 2 parts of 2-(morpholinothio)-benzothiazole per 100 parts of monomer. The emulsion is prepared from the following components:

|  | Parts by Weight |
|---|---|
| 2-(morpholinothio)benzothiazole | 2.75 |
| 4,4'-thiobis(6-tert-butyl-o-cresol) (Ethyl Antioxidant 736) | 0.11 |
| Water | 2.79 |
| Toluene | 3.87 |
| Sodium lauryl sulfate | 0.39 |
| Sodium salt of condensate of formaldehyde and a naphthalenesulfonic acid | 0.08 |

After the addition of the short-stopping agent, i.e., 4,4'-thiobis(6-tert-butyl-o-cresol), 0.7 part of sodium dibutyldithiocarbamate is added as a 23.5% solution in water.

The unreacted monomer is removed, the pH of the latex is adjusted to about 5.6 with acetic acid, and the polymer is isolated on a freeze drum, as described in U.S. Pat. No. 2,187,146.

For comparison a conventional chloroprene polymer is prepared using the same recipe as shown above except that 0.6 part of sulfur is used. Polymerization is carried out at 40°C to 87–88% monomer conversion. Polymerization is stopped by addition of about 1.64 part of an emulsion containing 27.5% tetraethylthiuram disulfide, 8.7% N-phenyl-1-naphthylamine, and 1.1% of 4,4'-thiobis(6-tert-butyl-o-cresol). No sulfenamide is added. After polymerization has been stopped, 0.26 part of sodium dibutyldithiocarbamate is added as a 47% aqueous solution.

Samples of the polymers are compounded using the following recipe:

|  | Parts by Weight |
|---|---|
| Polymer | 100 |
| Stearic acid | 0.5 |
| N-Phenyl-l-naphthylamine | 2 |
| Magnesia | 4 |
| Medium thermal carbon black | 100 |
| Naphthenic oil ("Circo" Light Rubber Process Oil, Sun Oil Co.) | 10 |
| Paraffin | 1 |
| Zinc oxide | 5 |
| Accelerator | As Shown |

Samples of the compounded stock are cured in a mold under pressure for 30 minutes at 153°C. The tear strength is measured by ASTM Method D 470–71, Section 7.6.

Flex resistance is measured by ASTM Method D 813–59 and is reported as the number of flexes required to reach a crack length of 0.5 inch.

Tensile properties are measured by ASTM Method D 412–64 T.

Table I shows the results of the testing. The following abbreviations are used:

$M_{200}$ — Modulus at 200% elongation, psi
$T_B$ — Tensile strength at break, psi
$E_B$ — Elongation at break, %

The following accelerators are used:
A — None
B — 0.5 part 2-mercapto-2-imidazoline
C — 0.4 part tetramethylthiourea The experimental polymer is designated as I and the conventional polymer as II.

TABLE I

| Accelerator | A | A | B | B | C | C |
|---|---|---|---|---|---|---|
| Polymer | I | II | I | II | I | II |
| Tear strength, lbs./in. | | | | | | |
| Original | 78 | 62 | 69 | 45 | 75 | 48 |
| Aged 3 days at 100°C. | 68 | 32 | 70 | 26 | 71 | 28 |
| Flex resistance flexes to 0.5 in. | $1.26\times10^6$(a) | $0.53\times10^6$ | $0.23\times10^6$ | 3000 | $0.53\times10^6$ | 3600 |
| Tensile properties | | | | | | |
| $M_{200}$ | 1100 | 1060 | 1140 | 1240 | 1000 | 1140 |
| $T_B$ | 1900 | 1600 | 1760 | 1740 | 1800 | 1680 |
| $E_B$ | 500 | 430 | 460 | 400 | 480 | 390 |

(a) At end of test, crack had grown to only 0.37 inch

It can be seen from the above table that the experimental polymers retain excellent tear strength and flex resistance after curing with conventional accelerators whereas the conventional polymers decrease significantly in both tear strength and flex resistance.

EXAMPLE 2

The same recipe for the chloroprene emulsion described above in Example 1 is used except that 0.6 part of sulfur is used. Conversion is carried to 85–88%. The latex is divided in half and one portion is stabilized with the same emulsion as used in Example 1 except that Sample A received 2 parts and Sample B received 4 parts per hundred parts of monomer of 2-(morpholinothio)benzothiazole. To each sample is then added 0.5 part of sodium dibutyldithiocarbamate. The latexes are aged at ambient temperature (25°–30°C) for 6 hours and the unreacted monomers are removed. The polymers are then isolated as in Example 1. The Mooney viscosities of the isolated polymers are about 26.

Samples of the polymers are compounded and cured without accelerators, in the same manner as shown in Table I.

The results are shown in Table II.

TABLE II

| Polymer | A | B | Conventional Polymer (same as Ex.1) |
|---|---|---|---|
| Tear Strength, lb./in. | | | |
| Original | 75 | 78 | 69 |
| Aged 3 days at 100°C | 78 | 64 | 43 |
| Flex Resistance Flexes to 0.5 in. | $1.26\times10^6$(a) | $1.26\times10^6$(b) | $8.15\times10^5$ |
| Tensile Properties | | | |
| $M_{200}$ | 800 | 625 | 900 |
| $T_B$ | 1650 | 1450 | 1500 |
| $E_B$ | 510 | 550 | 460 |

(a) At end of test crack had grown to only 0.16 inch
(b) At end of test crack had grown to only 0.13 inch When the procedure described above is repeated except 0.5 part of diethyl xanthogen disulfide is used in place of the thiocarbamate, similar results are obtained.

EXAMPLE 3

A series of polymers is prepared using the same recipe and procedure as described above in Example 1 except that different sulfenamides are used as shown below:

|  | Parts by Weight |
|---|---|
| A. 2-(cyclohexylaminothio)-benzothiazole | 2 |
| B. 2-(tert-butylaminothio)-benzothiazole | 2 |
| C. 2-(2,6-dimethylmorpholinothio)-benzothiazole | 2 |

Samples of the polymer are compounded and cured as in Example 1 using 0.5 part of 2-mercapto-2-imidazoline as the accelerator. Table III shows the tear strengths of the vulcanizates.

TABLE III

|  | Tear Strength, lbs./in. | |
|---|---|---|
|  | Original | Aged, 3 days at 100°C |
| A | 42 | 35 |
| B | 65 | 45 |

TABLE III-continued

Tear Strength, lbs./in.

| | Original | Aged, 3 days at 100°C |
|---|---|---|
| C | 72 | 48 |
| D* | 52 | 27 |

*Conventional polymer prepared as described in Example 1 except no sulfenamide was added to the latex.

EXAMPLE 4

This example illustrates polymerization in the presence of the sulfenamide. The recipe of the monomer emulsion is as follows:

| | Parts by Weight |
|---|---|
| Chloroprene | 100 |
| Nancy wood rosin | 4 |
| 2-(morpholinothio)benzothiazole | 2 |
| Sulfur | 0.35 |
| Water | 124.2 |
| Sodium hydroxide | 0.7 |
| Sodium salt of condensate of formaldehyde and a naphthalene-sulfonic acid | 0.7 |

Polymerization is carried out at 40°C. using the same catalyst as in Example 1. The polymerization is stopped at about 80% monomer conversion by addition of an emulsion composition containing about 0.015 part each of phenothiazine and 4-tert-butylpyrocatechol and 0.17 part of 2,6-di-tert-butyl-4-phenylphenol. After cooling to 25°C, 0.7 part of sodium dibutyldithiocarbamate is added. The latex is allowed to stand overnight and isolated as in Example 1. The Mooney viscosity (ML 1 + 2.5/100°C.) of the isolated polymer is 68.

The polymer is compounded using the following recipe:

| | Parts |
|---|---|
| Polymer | 100 |
| Stearic acid | 0.5 |
| Octylated diphenylamine ("Octamine", Uniroyal) | 2 |
| Magnesia | 4 |
| Semi-reinforcing furnace black | 23 |
| Medium thermal carbon black | 127 |
| Aromatic oil ("Sundex" 790, Sun Oil Co.) | 20 |
| Zinc oxide | 5 |

Samples are cured and tested as in Example 1. Table IV shows the results of the testing.

TABLE IV

| | Experimental Polymer | Conventional Polymer (same as Ex.1) |
|---|---|---|
| Tear strength, lbs./in. | | |
| Original | 53 | 31 |
| Aged 3 days, at 100°C. | 43 | 31 |
| Flex Resistance | | |
| Flexes to 0.5 in. | 2.3×10$^5$ | 900 |
| Tensile Properties | | |
| M$_{200}$ | 1460 | 1625 |
| T$_B$ | 1975 | 1775 |
| E$_B$ | 320 | 240 |

When the procedure described above is repeated except that 0.7 part of sodium ethyl xanthate is used in place of the thiocarbamate, similar results are obtained.

EXAMPLE 5

The procedure and ingredients described in Example 2 are repeated using 0.6 part of sulfur per hundred parts of monomer. However, polymerization is stopped by adding 1.86 parts of an emulsion containing about 1% each of phenothiazine and 4-tert-butylpyrocatechol and about 27% of 2,6-di-tert-butyl-4-phenylphenol. After polymerization is stopped 1.76 parts of 2-(morpholinothio)benzothiazole is added (as a solution in toluene). The isolated polymer has a Mooney viscosity of 177.

Samples of this polymer are compounded and used as in Example 1 using 0.6 part of tetramethylthiourea as the accelerator. One part of sodium diethyldithiocarbamate is added to the curing recipe for the experimental polymer to facilitate milling. Table V shows the tear strengths of the vulcanizate as compared with those of a conventional polymer prepared substantially as described in Example 1 but without sulfenamide.

TABLE V

| Tear Strength, lbs./in. | Experimental Polymer | Conventional Polymer |
|---|---|---|
| Original | 70.6 | 53.8 |
| After 3 days at 100°C | 71.8 | 32.8 |

I claim:

1. In a process for making chloroprene-sulfur copolymers which comprises polymerizing chloroprene in an alkaline aqueous emulsion in the presence of elemental sulfur and a free radical polymerization catalyst to form a chloroprene polymer latex, the improvement which comprises incorporating into the system at a time no later than when the polymer is in the latex state at least about 0.5 part by weight per hundred parts organic monomer of a sulfenamide compound having the structure

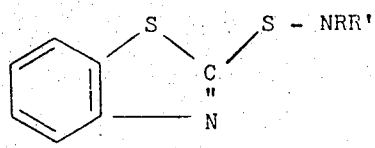

where R and R' are independently alkyl, cycloalkyl, aralkyl radicals or one of R or R' is hydrogen, or R and R' together form a morpholine or saturated ring containing only carbon and hydrogen in addition to the nitrogen, and after polymerization and subsequent to the addition of the sulfenamide or at the same time thereof, separately adding to the polymer at least about 0.1 part by weight per hundred parts organic monomer of at least one peptizing agent from the group of dialkyl xanthogen disulfides, water-soluble salts of alkyl xanthic acids, and water-soluble salts of dialkyl dithiocarbamic acids.

2. A process of claim 1 wherein R and R' are alkyl radicals having 1 to 12 carbon atoms and one of R or R' can be hydrogen.

3. The process of claim 1 wherein R and R' are cycloalkyl radicals having 5–7 carbon atoms and one of R or R' can be hydrogen.

4. A process of claim 1 wherein the sulfenamide is 2-(morpholinothio)benzothiazole.

5. A process of claim 1 wherein the sulfenamide is 2-(cyclohexylaminothio)benzothiazole.

6. A process of claim 1 wherein the sulfenamide is 2-(tert-butylaminothio)benzothiazole.

7. A process of claim 1 wherein the sulfenamide is 2-(2,6-dimethylmorpholinothio)benzothiazole.

8. A process of claim 1 wherein sulfenamide is added after polymerization while the polymer is still in the latex state.

9. A process of claim 1 wherein the peptizing agent is added to the latex.

10. A process of claim 1 wherein the amount of sulfenamide added is about from 0.5–10 parts by weight per hundred parts of monomer.

11. A process of claim 1 wherein the amount of elemental sulfur is about from 0.025–2.5% of organic monomer used.

12. A process of claim 1 wherein the peptizing agent is a water-soluble salt of dialkyldithiocarbamic acid.

13. A process of claim 12 wherein each alkyl group contains 1 to 4 carbon atoms.

14. A process of claim 12 wherein the peptizing agent is a water-soluble salt of dibutyldithiocarbamic acid.

15. A process of claim 12 wherein the sulfenamide is 2-(morpholinothio)benzothiazole.

16. A process of claim 15 wherein a free radical scavenger is added to the latex to terminate polymerization.

* * * * *